Patented Apr. 14, 1931

1,800,300

UNITED STATES PATENT OFFICE

GEORG KRÄNZLEIN, CHRISTOPH HARTMANN, AND ALBIN HARDT, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PIGMENT DYE AND PROCESS OF PREPARING IT

No Drawing. Application filed August 11, 1928, Serial No. 299,108, and in Germany September 11, 1926.

Our present invention relates to pigment dyes and process of preparing them.

We have found that dyestuffs containing one or several acid groups, including their water-soluble complex compounds with inorganic substances as for instance soluble chromium compounds, copper compounds and alumina compounds (cf. U. S. patent specification No. 1,090,123 issued Mar. 10, 1914, in the name of René Bohn and Carl Immerheiser, German patent specification No. 416,379 in the name of Gesellschaft fur Chemische Industrie in Basel and German patent specification No. 419,825 in the name of Badische Anilin- & Soda-Fabrik) can be converted into pigments in an excellent manner by adding to an aqueous solution of a salt of the dyestuffs in question an aqueous solution of a base or a salt thereof containing the following group:

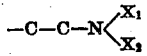

wherein $X_1$ and $X_2$ stand for hydrogen, $CH_3$ or —C—C— or $X_1$ and $X_2$ together for =C-C— which base has not the character of a dyestuff but has a basicity sufficiently great for the formation of a stable salt incapable of being hydrolized or capable of being hydrolized only with difficulty, and also renders the dyestuff insoluble or sparingly soluble in water.

As such basic organic materials have among others proved to be particularly useful dicyclohexylamine, methyldicyclohexylamine, tetramethyldiaminodibenzylsulfon, hexahydroaniline, quinoline, hexahydromethyl-ethyl-pyridine, 2-methylbenzimidazol of the formula

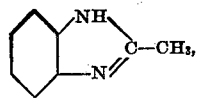

2-aminobenzimidazol, 2-alkylaminobenzimidazols and 2-arylaminobenzimidazols, 2-amino-perimidine of the formula

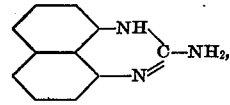

2-alkylamino-perimidines and 2-arylaminoperimidines, 2-hexahydroanilino-4.5-dihydroimidazol of the formula

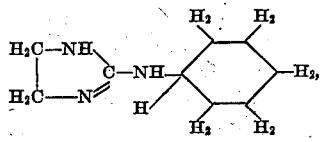

2-toluido-4.5-dihydroimidazol of the formula

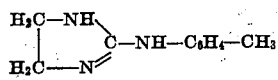

or the like and substitution products thereof, trisubstituted melamines for instance of the following formula:

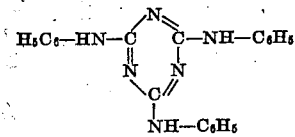

diethyl-α- and-β-naphthylamine, 3-aminoethylcarbazole and so on, and derivatives thereof.

The same pigments can also be obtained by causing the free dyestuff acid to react with the free base if necessary in a suitable solvent as for instance concentrated or aqueous alcohol. In this case the pigments, if they are to be isolated, must be prepared by precipitating them from their alcoholic solution by means of agents such as for instance water, or by evaporation.

The following examples are given by way of illustration, it being understood that they are in no way limitative. The parts are by weight:

(1) 42 parts of sodium 1-amino-4-phenylamino-anthraquinone-2-sulfonate are dissolved in 1000 parts of water, and to this solution is added at about 40° C. a solution of 18.5 parts of dicyclohexalamine in the calculated quantity of dilute hydrochloric acid. The pigment of the following formula:

[Structural formula]

which soon separates is filtered by suction and dried. It is a blue powder, dissolving in concentrated sulfuric acid to an almost colorless solution which becomes green on addition of formaldehyde and blue on addition of boric acid while hot. It is insoluble in water, but soluble in alcohol, acetone, benzyl-alcohol, cyclohexanone and cyclohexanol to a blue solution.

(2) By substituting in the preceding example for the dicyclohexylamine 14 parts of hexahydromethylethylpyridine dissolved in the calculated quantity of dilute hydrochloric acid, a dark-blue powder is obtained dissolving in concentrated sulfuric acid to an almost colorless solution which becomes green on addition of formaldehyde. The dye body is soluble in alcohol to a blue solution and insoluble in cold water.

(3) By using in Example 1 instead of dicyclohexylamine 6 parts of ethylenediamine, a dark blue powder is obtained dissolving in concentrated sulfuric acid to a feebly greenish solution which on addition of formaldehyde changes to green. Its solubility in alcohol is lower than that of the hexahydromethylethylpyridine salt described in the preceding example. The body is insoluble in cold water. It has most probably the following formula:

[Structural formula]

(4) 114 parts of a 85% dyestuff from tetrazotized 3.3'-dichlorbenzidine and 2 mols of sodium 2-naphthylamine-3.6-disulfonate are precipitated in a cold aqueous solution with a solution of 110 parts of diethyl-α-naphthylaminesulfate. The precipitating pigment is separated from the liquid and dried at about 30° C. to 40° C. It is a brownish-red powder soluble in concentrated sulfuric acid to a blue solution which changes to red on addition of formaldehyde. The body dissolves in alcohol to a yellowish-red solution which in a thin layer is bluish-red. It is insoluble in cold water.

(5) 42 parts of sodium 1.4-ditoluido-5.8-dihydroxy-anthraquinone-disulfonate of about 95 per cent strength are dissolved in a small quantity of water and precipitated while cold with a solution of 15 parts of hexahydroaniline which has been neutralized by means of hydrochloric acid. The precipitate is freed from the liquid by filtration and dried at about 30° C. to 40° C. When ground it is a dark green powder soluble in concentrated sulfuric acid to a green solution which changes only very slightly on addition of boric acid or formaldehyde. The dye body is soluble in alcohol to a green solution and to a small extent also in cold water with like coloration.

(6) 63 parts of sodium para-nitrophenyl-azosalicylate are dissolved in about 2000 parts of water and to this solution there is added at room temperature an aqueous solution of 35 parts of quinoline hydrochloride. The yellow dye body of the formula:

[Structural formula]

which separates is filtered by suction and dried. It is an orange-yellow powder soluble in concentrated sulfuric acid, in acetone and benzyl-alcohol to a reddish-yellow solution and in alcohol and benzene to a yellow solution.

In the preceding example the azo dyestuff may advantageously be replaced by the combination ortho-aminobenzene-sulfonic acid coupled with 1-ortho-sulfophenyl-5-pyrazolone-3-carboxylic acid or para-aminobenzenesulfonic acid coupled with 1.2'-chloro-5'-sulfophenyl-3-methyl-5-pyrazolone, and the base may be replaced for instance by the 2-ortho-toluido-benzimidazol of the formula:

[Structural formula]

(7) To an aqueous solution of 20 parts of the dyestuff of the formula:

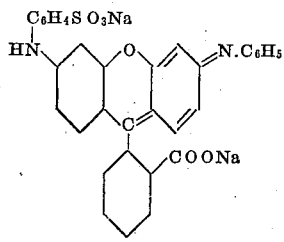

there is added at about 10° C. to 20° C. a solution of 10 parts of 2-methylbenzimidazol of the formula:

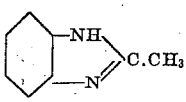

(about two molecular proportions) in the calculated quantity of dilute hydrochloric acid. The resulting precipitate is filtered and dried. It is a dark violet powder almost insoluble in water, soluble in alcohol to a reddish-violet and in benzyl-alcohol to a bluish-violet solution. The color of its solution in concentrated sulfuric acid is yellowish-red which on addition of formaldehyde gradually turns to bluish-red.

(8) 10.4 parts of the dyestuff:

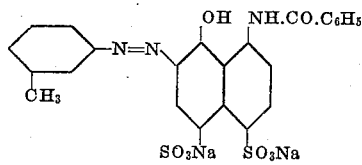

are dissolved in 400 parts of water and precipitated at room temperature with a neutral solution of 7 parts of methyldicyclohexylamine in the calculated quantity of dilute sulfuric acid. The precipitate is filtered by suction and dried at about 30° C. It is a red powder soluble in concentrated sulfuric acid to a yellowish-red solution which in a thin layer has a bluish-red appearance. It is soluble to bluish-red solutions in alcohol, acetone, benzyl-alcohol, more difficultly soluble in cyclo-hexanol and benzyl acetate. It is insoluble in cold water.

(9) 10 parts of the dyestuff:

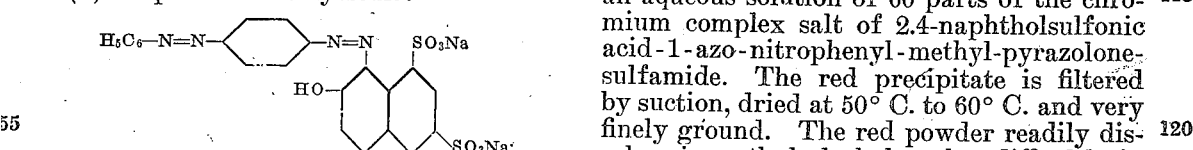

are precipitated in an aqueous solution at room temperature with a neutral solution of 8 parts of 2-anilino-benzimidazol of the formula:

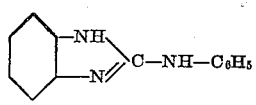

in dilute hydrochloric acid. After being isolated and dried, the dyestuff forms a red powder, soluble to red solutions in alcohol, methylalcohol, butanol, benzyl-alcohol, diacetone-alcohol, and also in alcohol lacquers, cellon lacquers and zapon lacquers.

For the base used in this example there may advantageously be substituted its substitution products, particularly its mono- and dimethyl derivatives, both those substituted in the benzene nucleus and at the nitrogen.

(10) 10 parts of the dyestuff:

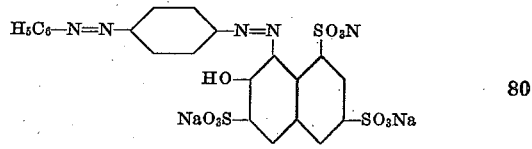

are precipitated in an aqueous solution with a warm solution of 12 parts of 2-anilidoperimidine of the formula:

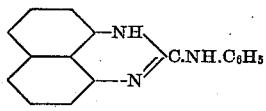

in water and the calculated quantity of hydrochloric acid. The dye body when separated and dried constitutes a red powder of about the same solubility as the dyestuff obtainable according to the preceding example.

For the anilidoperimidine used in this example there may be substituted similar compounds, as for instance 2-aminoperimidine of the formula:

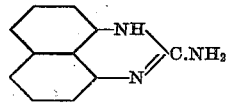

(11) 17 parts of sodium 1-amino-4-phenylaminoanthraquinone-2-sulfonate are precipitated in the manner above indicated with a neutral solution of 7 parts of 2-toluido-4.5-dihydroimidazol in dilute hydrochloric acid. The dried precipitate is a blue powder showing the same properties of solubility as the dyestuff prepared in Example 9.

(12) A neutral solution of 17 parts of 2-toluido-4.5-dihydroimidazol in dilute hydrochloric acid is run, while stirring, into an aqueous solution of 60 parts of the chromium complex salt of 2.4-naphtholsulfonic acid-1-azo-nitrophenyl-methyl-pyrazolone-sulfamide. The red precipitate is filtered by suction, dried at 50° C. to 60° C. and very finely ground. The red powder readily dissolves in methyl alcohol, rather difficultly in alcohol, and it is soluble in alcohol lacquers, cellon lacquers and zapon lacquers, insoluble in benzine, benzene and benzylacetate.

(13) 10 parts of the dyestuff:

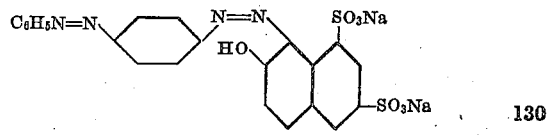

are precipitated in an aqueous solution at room temperature with a neutral solution of 8 parts of dicyclohexylamine in dilute sulfuric acid. When filtered and dried the dye body is a red powder soluble to a red solution in alcohol, methyl alcohol butanol, benzyl-alcohol, and also in alcohol lacquer, cellon lacquer and zapon lacquer.

Instead of the dyestuffs named in the preceding examples there may be used for producing the pigment dyes in like manner other dyestuffs of the most varied classes of dyestuffs, provided only that they contain acid salt-forming groups, as for instance 1-amino-4-para-acetaminoanilido-2-anthraquinonesulfonic acid of the formula:

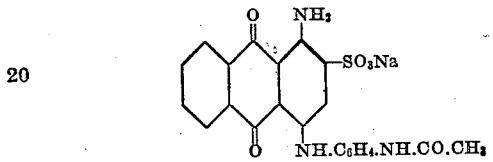

1.4-dihydroxy-5.8-di-para-toluidoanthraquinonedisulfonic acid, 1-5-dihydroxy-4.8-di-para-toluidoanthraquinonedisulfonic acid, 1.4-diaminoanthraquinone-2-sulfonic acid, 1-hydroxy-4-para-toluidoanthraquinonesulfonic acid, 1.5-di-para-toluidoanthraquinonedisulfonic acid, anthrapyrimidine-4-para-toluidosulfonic acid of the formula:

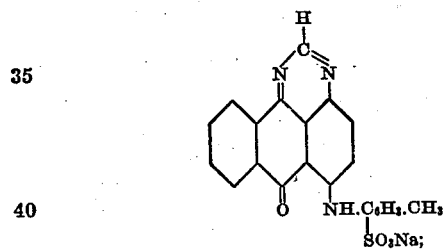

methylanthrapyridon-4-arylsulfonic acids of the formula:

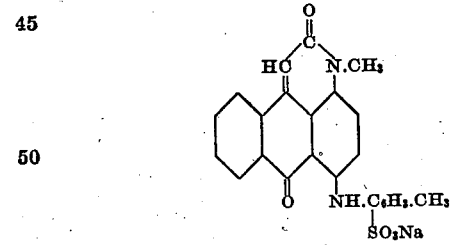

1.4-diaminoanthraquinone-2-phenoxysulfonic acid of the formula:

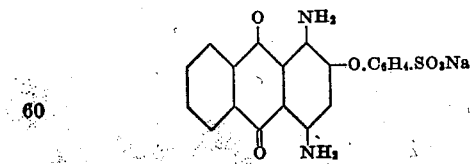

alumina lacquers of polyhydroxyanthraquinonesulfonic acids or salts thereof, as for instance of alizarinesulfonic acid or of sodium hexahydroxyanthraquinone-3.7-disulfonate. Furthermore the dyestuff of the following formula:

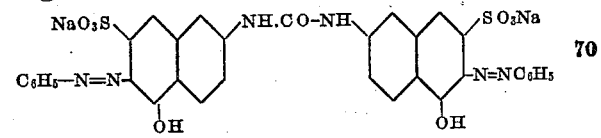

or the dyestuff of the formula:

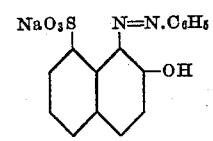

or rhodamines or triphenylmethane dyestuffs, as for example the acid triphenylmethane dyestuff of the formula:

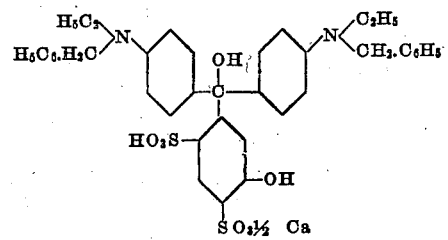

or the dyestuff of the following formula:

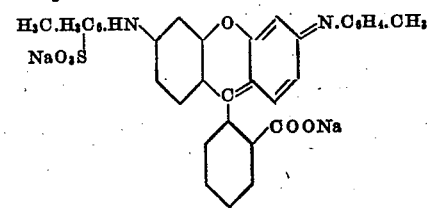

obtainable by the action of ortho-toluidine upon fluorescein chloride and sulfonation of the reaction product, and other dyestuffs.

For preparing water-insoluble or sparingly-soluble precipitates, the organic bases used as precipitating agents for each of the dyestuffs indicated may also be used in any desired combination to any of the other above-enumerated dyestuffs and generally to all dyestuffs containing acid salt-forming groups.

The preceding examples form only a small part of the pigments obtainable by suitably selecting the bases and dyestuffs. They are particularly useful and of strong coloring power, and they yield tints of good fastness to light.

The said pigment dyes are insoluble or difficultly soluble in water, but soluble in many organic solvents, some of them being otherwise known as solvents for cellulose esters or cellulose ethers and for lacquers. The said pigment dyes are useful in dyeing solutions of cellulose ethers and cellulose esters and of lacquers in organic solvents.

The pigments as such or after being mechanically mixed in a dry way with one of the usual substrata as for instance hydrate of alumina, heavy spar, blanc fixe or a mixture thereof may be mixed with varnish and printed, or mixed with linseed oil and applied with a brush, or mixed with an aqueous binding agent and applied with a brush, or the pigments are mixed in the form of an aqueous paste with the dry or water-moist usual substrata, for example those above indicated, dried and mixed with varnish as above described; they yield very intense clear shades of very good fastness to light.

The precipitation of the dyestuff salts with the salts of the organic bases or the reaction of the free dyestuff acids with the free bases can of course also be effected in the presence of a substratum as for instance of one of those above indicated, hydrate of alumina, heavy spar, blanc fixe or a mixture thereof.

This application contains subject matter in common with our co-pending U. S. patent application Ser. No. 212,146 filed August 10, 1927.

We claim:

1. The process of preparing pigment dyes which comprises treating an organic dyestuff containing acid salt-forming groups in the presence of a solvent with an organic base containing the following grouping:

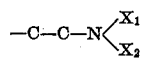

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt.

2. The process of preparing pigment dyes which comprises treating an azo dyestuff containing acid salt-forming groups in the presence of a solvent with an organic base containing the following grouping:

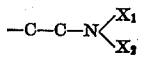

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt.

3. The process of preparing pigment dyes which comprises treating an azo dyestuff of the following general formula:

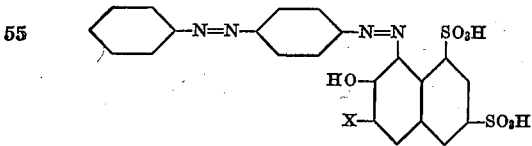

wherein X stands for hydrogen or the sulfo group in the presence of a solvent with an organic base containing the following grouping:

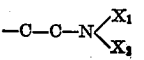

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt.

4. The process of preparing pigment dyes which comprises treating an azo dyestuff of the following general formula:

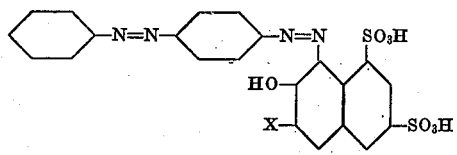

wherein X stands for hydrogen or the sulfo group in the presence of a solvent with dicyclohexylamine.

5. The process of preparing pigment dyes which comprises treating a salt of an organic dyestuff containing acid salt-forming groups dissolved in water with a salt of an organic base containing the following grouping:

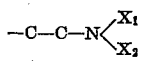

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt.

6. The process of preparing pigment dyes which comprises treating a salt of an azo dyestuff containing acid salt-forming groups dissolved in water with a salt of an organic base containing the following grouping:

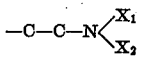

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt.

7. The process of preparing pigment dyes which comprises treating a salt of an azo dyestuff of the following general formula:

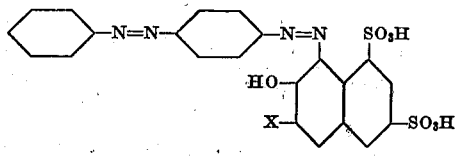

wherein X stands for hydrogen or the sulfo group dissolved in water with a salt of an organic base containing the following grouping:

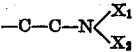

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt.

8. The process of preparing pigment dyes which comprises treating a salt of an azo dyestuff of the following general formula:

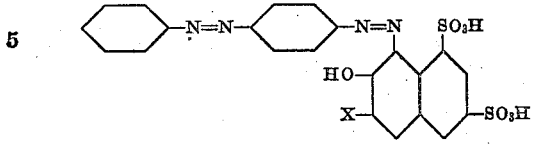

wherein X stands for hydrogen or the sulfo group dissolved in water with a salt of dicyclohexylamine.

9. The process of preparing a pigment dye which comprises treating the disodium salt of the dyestuff

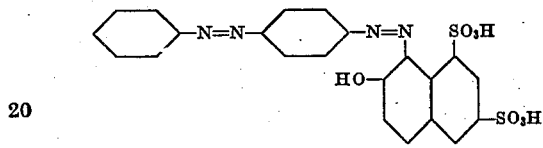

dissolved in water with the sulfate of dicyclohexylamine.

10. As new products, pigment dyes being salts formed on the one side from an organic dyestuff containing acid salt-forming groups and on the other side from an organic base containing the following grouping:

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt, which salts are insoluble or difficultly soluble in water, but soluble in many organic solvents—some of them being otherwise well known as solvents for cellulose esters or cellulose ethers and for lacquers as for instance alcohol, acetone, benzyl alcohol, butanol, cyclohexanone, cyclohexanol or the like.

11. As new products, pigment dyes being salts formed on the one side from an azo dyestuff containing acid salt-forming groups and on the other side from an organic base containing the following grouping:

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt, which salts are insoluble or difficultly soluble in water, but soluble in many organic solvents, some of them being otherwise well known as solvents for cellulose esters or cellulose ethers and for lacquers as for instance alcohol, acetone, benzyl alcohol, butanol, cyclohexanone, cyclohexanol or the like.

12. As new products, pigment dyes being salts formed on the one side from an azo dyestuff of the following general formula:

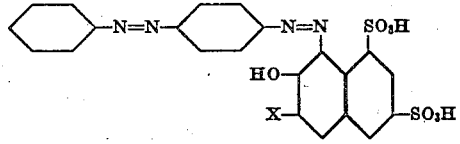

wherein X stands for hydrogen or the sulfo group and on the other side from an organic base containing the following grouping:

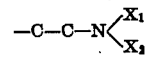

wherein $X_1$ and $X_2$ stand for hydrogen, alkyl or —C—C— or $X_1$ and $X_2$ together for =C—C— which base has not the character of a dyestuff but has a basicity sufficient for the formation of a stable salt, which salts are insoluble or difficultly soluble in water, but soluble in many organic solvents, some of them being otherwise well known as solvents for cellulose esters or cellulose ethers and for lacquers as for instance alcohol, acetone, benzyl alcohol, butanol, cyclohexanone, cyclohexanol or the like.

13. As new products, pigment dyes being salts formed on the one side from an azo dyestuff of the following general formula:

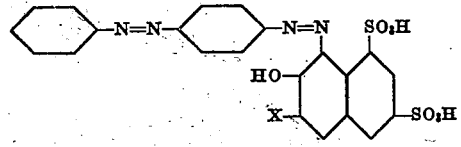

wherein X stands for hydrogen or the sulfo group and on the other side from dicyclohexylamine, which salts are insoluble or difficultly soluble in water, but soluble in many organic solvents, some of them being otherwise well known as solvents for cellulose esters or cellulose ethers and for lacquers as for instance alcohol, acetone, benzyl alcohol, butanol, cyclohexanone, cyclohexanol or the like.

14. As a new product, a pigment dye of the formula:

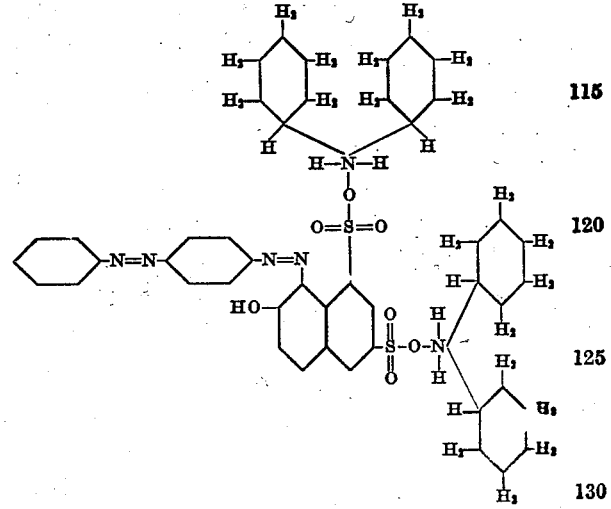

being a red powder soluble to a red solution in alcohol, methyl alcohol, butanol, benzyl alcohol, alcohol lacquer, cellon lacquer and zapon lacquer.

15. As a new product, a pigment dye of the following formula:

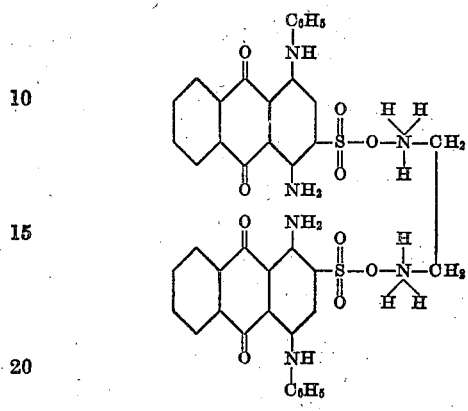

being a dark blue powder, insoluble in cold water, soluble in concentrated sulfuric acid to a feebly greenish solution which on addition of formaldehyde changes to green.

In testimony whereof, we affix our signatures.

GEORG KRÄNZLEIN.
CHRISTOPH HARTMANN.
ALBIN HARDT.